United States Patent [19]

Calderbank et al.

[11] Patent Number: 4,939,555
[45] Date of Patent: Jul. 3, 1990

[54] TRELLIS CODING ARRANGEMENT

[75] Inventors: Arthur R. Calderbank, Plainfield; Neil J. A. Sloane, Highland Park, both of N.J.

[73] Assignee: AT&T Bell Laboratories, Murray Hill, N.J.

[21] Appl. No.: 49,747

[22] Filed: May 13, 1987

[51] Int. Cl.⁵ ............................................. H04L 25/34
[52] U.S. Cl. ........................................ 375/17; 375/39; 371/43
[58] Field of Search ............... 375/37, 26, 27, 17, 375/19, 34, 59, 39; 371/43, 55, 56

[56] References Cited

U.S. PATENT DOCUMENTS

| | | | |
|---|---|---|---|
| 4,084,137 | 4/1978 | Welti | 375/39 |
| 4,457,004 | 6/1984 | Gersho et al. | 375/39 |
| 4,507,648 | 3/1985 | Conway et al. | 340/347 DD |
| 4,581,601 | 4/1986 | Calderbank et al. | 375/94 |
| 4,748,626 | 5/1988 | Wong | 375/39 |

OTHER PUBLICATIONS

An 8-Dimensional Trellis Code, Calderbank et al., Proceedings of the IEEE, vol. 74, No. 5, May 1986, pp. 757-759.

Primary Examiner—Douglas W. Olms
Assistant Examiner—Marianne Huseman
Attorney, Agent, or Firm—Ronald D. Slusky; David R. Padnes

[57] ABSTRACT

In a trellis coding arrangement, the alphabet is comprised of a plurality of cosets of a sublattice of a p-dimensional lattice, where $p<4$.

16 Claims, 2 Drawing Sheets

TRELLIS CODING ARRANGEMENT

BACKGROUND OF THE INVENTION

The present invention relates to data transmission systems and, in particular, to channel coding in such systems.

Much attention has been focused in recent years on channel codes which provide so-called coding gain. Prominent among these are the so-called "trellis" codes described in such papers as G. Ungerboeck, "Channel Coding With Multilevel/Phase Signals," *IEEE Trans. Information Theory*, IT-28, 1982, pages 55-67; A. R. Calderbank and N. J. A. Sloane, "A New Family of Codes for Dial-Up Voice Lines," *Proc. IEEE Global Telecomm Conf.*, November 1984, pages 20.2.1-20.2.4; A. R. Calderbank and N. J. A. Sloane, "Four-Dimensional Modulation With an Eight-State Trellis Code," *AT&T Technical Journal*, Vol. 64, No. 5, May-June 1985, pages 1005-1018; A. R. Calderbank and N. J. A. Sloane, "An Eight-Dimensional Trellis Code," *Proc. IEEE*, Vol. 74, No. 5, May 1986, pages 757-759; and L.-F. Wei, "Rotationally Invariant Convolutional Channel Coding With Expanded Signal Space—Part I: 180 Degrees and Part II: Nonlinear Codes," *IEEE J. Select. Areas Commun.*, Vol. SAC-2, September 1984, pages 659-686, all of which are hereby incorporated by reference.

In typical known trellis coding arrangements, n of the bits of each of a succession of $(k+n)$-bit input words are applied to a so-called trellis coder which, in turn, selects one of a plurality of $2^m$ subsets of the signalling alphabet, where $m>n$. (Other types of codes, such as the so-called Reed-Solomon codes, can be used to select the subset.) Each subset contains $2^k$ signalling points and the other k bits, referred to herein as the non-trellis-coded bits, are used to identify a particular one of the $2^k$ points in the selected subset as the signal point to be communicated to the receiver. So-called Viterbi decoding is then used in the receiver to recover the most likely sequence of transmitted signal points and, in turn, the $(k+n)$-bit input words.

Conventional block coding would require an alphabet of $2^{(k+n)}$ signal points to transmit the $(k+n)$-bit input words. By contrast, as can be seen from the foregoing, trellis coding requires a larger alphabet of $2^{(k+m)}$ signal points However, in exchange for this redundancy, a trellis code, if properly designed, will provide an increase over block coding in the minimal distance between signal points communicated to the receiver This increase, when normalized by the average transmitted signal power, is referred to as the "coding gain" which manifests itself in the form of enhanced immunity to such random channel impairments as additive noise.

It was known to those working with block codes even prior to the advent of trellis coding that the minimal distance between signal points in the alphabet—and thus the immunity to random channel impairments—can be increased for a given maximal signal power by increasing the dimensionality of the alphabet, e.g., using an eight-dimensional alphabet rather than a four- or two-dimensional alphabet. This recognition can be traced to the pioneering work of Nyquist and is illustrated in the more recent work of, for example, G. Welti in U.S. Pat. No. 4,084,137 issued Apr. 11, 1978 and A. Gersho et al in U.S. Pat. No. 4,457,004 issued June 26, 1984. It was thereafter shown that this principle was equally applicable to arrangements employing trellis codes. Specifically, trellis codes with four-dimensional modulation are shown, for example, in G. D. Forney et al, "Efficient Modulation for Band-Limited Channels, *IEEE Journal on Selected Areas of Communications*, Vol. SAC-2, No. 5, Sept. 1984, pp. 632-647; our aforementioned article in the *AT&T Technical Journal*; and our U.S. Pat. No. 4,581,601 issued Apr. 8, 1986.

One of the aspects necessary to the the design of a trellis coding arrangement is the partitioning of the selected alphabet into appropriate subsets as aforesaid. To date, the published literature and patents—which are, in the main, directed to trellis codes with two- and four-dimensional alphabets—seem to have arrived at the subsets heuristically. It becomes more difficult, however, to arrive at an advantageous partition as the dimensionality of the alphabet increases to eight and higher dimensions.

SUMMARY OF THE INVENTION

We have discovered a new, deterministic technique for partitioning the alphabet, and our invention thus encompasses trellis coding arrangements in which the alphabet is partitioned in accordance with that technique. In particular, a trellis coding arrangement embodying the principles of the invention uses an alphabet whose points are the points of a p-dimensional lattice, where $p>4$, with each of the subsets being a respective coset of a sublattice of that lattice This approach is advantageous in that, for example, it makes the coding process relatively easy to implement and assures that the points in the various subsets are well-separated from one another, thereby enabling a good coding gain to be achieved.

DETAILED DESCRIPTION

Figure 1:
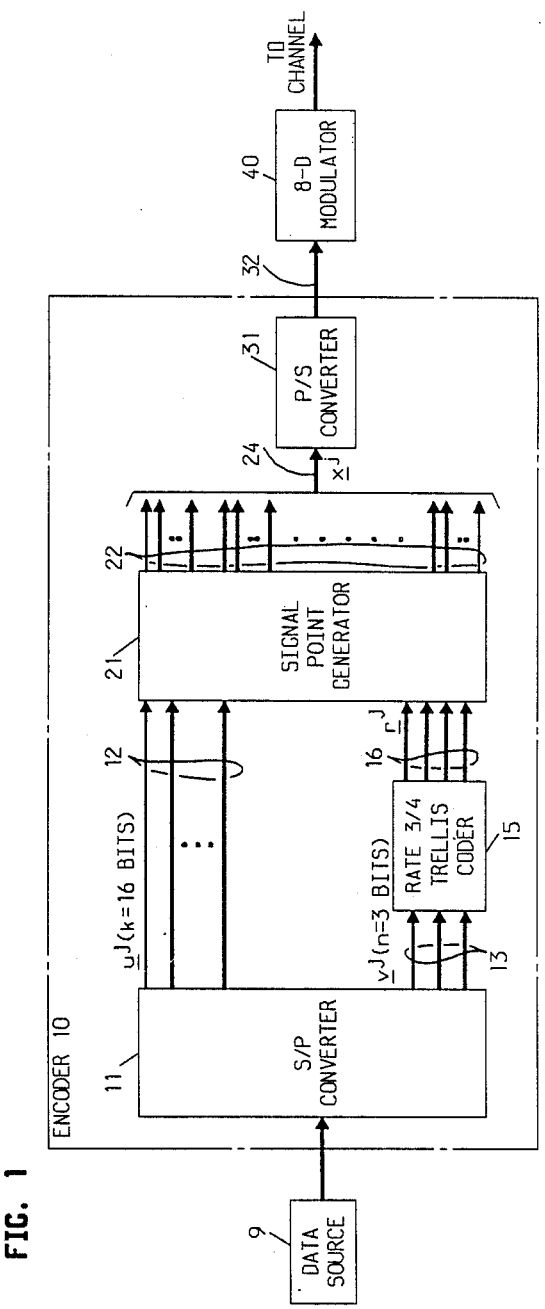
FIG. 1 is a block diagram of a data transmitter embodying the principles of the invention.

Encoder 10 in the transmitter of FIG. 1 receives data in the form of a serial bit stream from a data source 9. This bit stream is applied to serial-to-parallel (S/P) converter 11 within the encoder, which generates a sequence of $(k+n)$-bit words at a predetermined baud, or symbol, rate. Illustratively, $k=16$ and $n=3$, and converter 11 generates these 19-bit words in parallel on its nineteen output leads. In particular, a sixteen-bit word, denoted as the vector $u^j$, is provided on leads 12, and a three-bit word, denoted as the vector $v^j$, is provided on leads 13. The superscript "j" advances at the baud rate.

The task of the transmitter of FIG. 1 is to convey to a receiver (not shown) signals representing respective signal points of an alphabet wherein the points of the alphabet are points from a predetermined p-dimensional lattice. Illustratively, $p=8$. To this end, the bits on leads 13, referred to herein as the "trellis-coded bits", are applied to a rate ¾ trellis coder of conventional design. Coder 15 expands its three-bit input into a four-bit word on leads 16, denoted as the vector $r^j$, identifying one of sixteen predetermined subsets of points of the aforementioned alphabet In accordance with the invention, the subsets, more particularly, are cosets of a predetermined sublattice of the lattice, as discussed in detail hereinafter. The bits of coset-identifying word, $r^j$, are applied to signal point generator 21, which also receives as inputs the sixteen bits on leads 12, referred to herein as the "non-trellis-coded bits".

The job of signal point generator 21 is to generate for the $j^{th}$ baud interval an eight-dimensional signal point $x^j=(x_1^j, \ldots, x_8^j)$, each of whose eight components is represented by a binary word on a respective group of the generator 21 output leads 22, which are shown bundled into a cable 24. The components of $x^j$ are applied from cable 24 to parallel-to-serial (P/S) converter 31. The latter sequentially provides on its output cable 32 a sequence of multi-bit words respectively representing the eight components of $x^j$. These are applied to a eight-dimensional modulator 40 of conventional design and thence to the transmission channel The underlying theory of trellis coding is that, at any point in time, the next signal point to be transmitted can be taken from only particular ones of the alphabet subsets—or, more specifically in the case of the present invention, particular ones of the cosets—depending on the so-called state of the trellis coder The state of a trellis coder is a function of at least one bit applied to the trellis coder during a prior signalling interval, i.e., at least one bit of $v^{j-w}$, for some integer $w>0$. In this embodiment, more specifically, the state of the coder is a function of all three bits of $v^{j-1}$, i.e., the word applied to coder 15 in the preceding baud interval.

The trellis code, i.e., the rule which identifies the particular one coset from which the next transmitted point is to come, is often expressed graphically by a so-called trellis diagram. Alternatively, an output word $r^j$ identifying that one coset can be expressed as $$r^j = G[t^j]^T$$

where G is a predetermined generator matrix and $[t^j]^T$ is the transpose of a row vector $t^j$ whose components are the current trellis coder input bits, $v^j$, and the state-determining prior inputs. In the present embodiment, in particular, $t^j = (v_3^{j-1}, v_2^{j-1}, v_1^{j-1}, v_3^j, v_2^j, v_1^j)$ and $$G = \begin{bmatrix} 101010 \\ 100101 \\ 110110 \\ 011001 \end{bmatrix}$$

Thus, if the current trellis coder input word $v^j$ is (0,0,1) and the prior trellis coder input word $v^{j-1}$ is (1,1,0), straightforward matrix multiplication of G by $[t^j]^T=(1,1,0,0,0,1)^T$ yields $r^j=(1,0,0,0)$, indicating that the next signal point to be generated is to come from a coset associated with that value of $r^j$.

Figure 2:
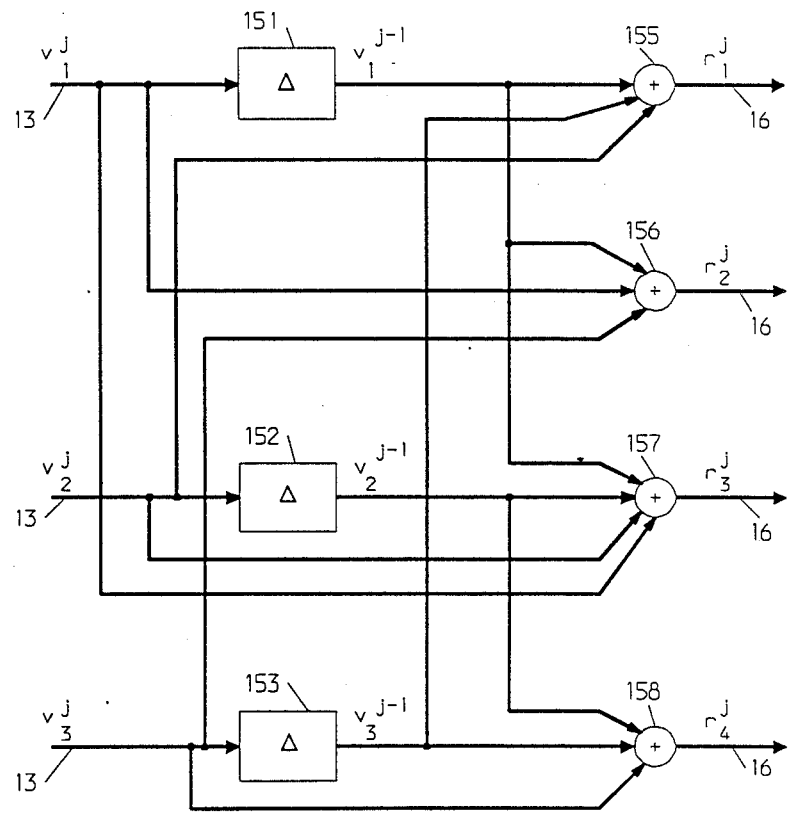
FIG. 2 is a block diagram of the trellis coder used in the transmitter of FIG. 1.

A circuit embodiment of trellis coder 15 is shown in FIG. 2. The three current bits applied to the coder, $v_1^j$, $v_2^j$ and $v_3^j$, are applied thereto from leads 13. The three bits previously applied to the coder, $v_1^{j-1}$, $v_2^{j-1}$ and $v_3^{j-1}$ for the $j^{th}$ baud interval, are held in one-bit delay elements 151, 152 and 153, respectively, each of which implements a one-baud-interval delay. The values held in the three delay elements are applied to binary adders 155 through 158 along with the values of the three current bits on leads 13, in the manner shown. Each binary adder puts out a "0" ("1") if an even (odd) number of its input bits has the value "1".

The outputs of adders 155 through 158 are the components $r_1^j$, $r_2^j$, $r_3^j$, and $r_4^j$ of vector $r^j$ which, again, identifies which of the sixteen cosets, denoted $C_1$ through $C_{16}$, the next signal point to be generated belongs to.

As mentioned above, the subsets into which the alphabet is divided are, in accordance with the invention, cosets of a sublattice of a predetermined lattice. As a first example, consider a version of the well-known Gosset lattice $E_8$ consisting of the points, or vectors, $x=(x_1, \ldots, x_8)$ which have the property that, when they are multiplied by 2, the $x_i$ are all integers, and, when even integers are replaced by 0 and odd integers are replaced by 1, become one of the following sixteen vectors:

| | |
|---|---|
| (0,0,0,0,0,0,0,0) | (0,1,0,1,0,1,0,1) |
| (1,1,1,1,1,1,1,1) | (1,0,1,0,1,0,1,0) |
| (0,0,0,0,1,1,1,1) | (0,1,0,1,1,0,1,0) |
| (1,1,1,1,0,0,0,0) | (1,0,1,0,0,1,0,1) |
| (0,0,1,1,0,0,1,1) | (0,1,1,0,0,1,1,0) |
| (1,1,0,0,1,1,0,0) | (1,0,0,1,1,0,0,1) |
| (0,0,1,1,1,1,0,0) | (0,1,1,0,1,0,0,1) |

Examples of vectors in $E_8$ are
$(1, \frac{1}{2}, -1, 3/2, 0, \frac{1}{2}, 0, \frac{1}{2})$ and
$(\frac{1}{2}, -3/2, -3/2, 5/2, \frac{1}{2}, \frac{1}{2}, 3/2, -5/2)$.

The so-called basis of this version of $E_8$ is the following matrix J:

$$J = \frac{1}{2}\begin{bmatrix} 11111111 \\ 01010101 \\ 00110011 \\ 00020000 \\ 00001111 \\ 00000200 \\ 00000020 \\ 00000002 \end{bmatrix}$$

The rows of J are the so-called generating vectors of $E_8$, and $E_8$ is defined by J in that $E_8$ comprises the infinite set of points arrived at by taking integer combinations of those generating vectors.

A sublattice of $E_8$, denoted $H(E_8)$, is itself a lattice obtained from $E_8$ by at least an expansion of its scale, possibly combined with a rotation. And just as the lattice $E_8$ is defined by its basis J, a sublattice of $E_8$ is defined by its basis J', where $$J' = JH$$

and H is a matrix which defines the expansion/rotation. In the present illustrative embodiment, in particular, $$H = \frac{1}{2}\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

leading to $$J' = \begin{bmatrix} 2 & 0 & 0 & 0 & 0 & 0 & 0 & 0 \\ 1 & -1 & 0 & 0 & 0 & 0 & 0 & 0 \\ 1 & 0 & -1 & 0 & 0 & 0 & 0 & 0 \\ \frac{1}{2} & -\frac{1}{2} & -\frac{1}{2} & \frac{1}{2} & \frac{1}{2} & -\frac{1}{2} & -\frac{1}{2} & \frac{1}{2} \\ 1 & 0 & 0 & 0 & -1 & 0 & 0 & 0 \\ \frac{1}{2} & -\frac{1}{2} & \frac{1}{2} & -\frac{1}{2} & -\frac{1}{2} & \frac{1}{2} & -\frac{1}{2} & \frac{1}{2} \\ \frac{1}{2} & \frac{1}{2} & -\frac{1}{2} & -\frac{1}{2} & -\frac{1}{2} & -\frac{1}{2} & \frac{1}{2} & \frac{1}{2} \\ \frac{1}{2} & -\frac{1}{2} & -\frac{1}{2} & \frac{1}{2} & -\frac{1}{2} & \frac{1}{2} & \frac{1}{2} & -\frac{1}{2} \end{bmatrix}$$

and the sublattice $H(E_8)$ defined by $J'$ consists of the vectors $xH$ where $x$ is an element of $E_8$. The matrix $H$ effects a $\sqrt{2}$ expansion of scale and a rotation of $E_8$ to arrive at $H(E_8)$. The elements of $H(E_8)$ are vectors whose elements a) are either all integers or all halves of odd integers, and b) have an even sum. Examples are (1, 1, −3, 2, −5, 4, 6, 4) and (3/2, −3/2, $\frac{1}{2}$, $\frac{1}{2}$, $\frac{1}{2}$, 5/2, −7/2, −$\frac{1}{2}$).

Having defined the sublattice $H(E_8)$, we have inherently defined a number of cosets of $H(E_8)$ in the lattice $E_8$. Specifically, the cosets of the sublattice are the unique sets of points in the lattice obtained by various translations of the sublattice. Alternatively stated, $E_8$ is a disjoint union of a finite number of translates of its sublattice $H(E_8)$. The group of cosets is denoted by $E_8/H(E_8)$. In this example there are sixteen cosets of $H(E_8)$ in $E_8$, the $r^{th}$ coset, denoted $C_r$, comprising the points $H(E_8)+s_r$, where $s_r$ is a translation vector associated with that coset. The sixteen translation vectors are as follows:

$s_1 = [0, 0, 0, 0, 0, 0, 0, 0]$ $s_2 = [1, 0, 0, 0, 0, 0, 0, 0]$ $s_3 = [\frac{1}{2}, \frac{1}{2}, \frac{1}{2}, \frac{1}{2}, 0, 0, 0, 0]$ $s_4 = [\frac{1}{2}, \frac{1}{2}, \frac{1}{2}, -\frac{1}{2}, 0, 0, 0, 0]$ $s_5 = [\frac{1}{2}, \frac{1}{2}, 0, 0, \frac{1}{2}, \frac{1}{2}, 0, 0]$ $s_6 = [\frac{1}{2}, \frac{1}{2}, 0, 0, \frac{1}{2}, -\frac{1}{2}, 0, 0]$ $s_7 = [\frac{1}{2}, \frac{1}{2}, 0, 0, 0, 0, \frac{1}{2}, \frac{1}{2}]$ $s_8 = [\frac{1}{2}, \frac{1}{2}, 0, 0, 0, 0, \frac{1}{2}, -\frac{1}{2}]$ $s_9 = [\frac{1}{2}, 0, \frac{1}{2}, 0, \frac{1}{2}, 0, \frac{1}{2}, 0]$ $s_{10} = [-\frac{1}{2}, 0, \frac{1}{2}, 0, \frac{1}{2}, 0, \frac{1}{2}, 0]$ $s_{11} = [0, -\frac{1}{2}, 0, -\frac{1}{2}, \frac{1}{2}, 0, \frac{1}{2}, 0]$ $s_{12} = [0, -\frac{1}{2}, 0, \frac{1}{2}, \frac{1}{2}, 0, \frac{1}{2}, 0]$ $s_{13} = [0, -\frac{1}{2}, \frac{1}{2}, 0, 0, -\frac{1}{2}, \frac{1}{2}, 0]$ $s_{14} = [0, -\frac{1}{2}, \frac{1}{2}, 0, 0, \frac{1}{2}, \frac{1}{2}, 0]$ $s_{15} = [0, -\frac{1}{2}, \frac{1}{2}, 0, \frac{1}{2}, 0, 0, -\frac{1}{2}]$ $s_{16} = [0, -\frac{1}{2}, \frac{1}{2}, 0, \frac{1}{2}, 0, 0, \frac{1}{2}]$ As noted above, it is the job of signal point generator 21 to respond to the sixteen-bit word on leads 12 to identify, and to output on leads 22, a particular one of the elements of the coset identified by the word on leads 16. One way to achieve this is to have signal point generator 21 store the $4^8$ points of the sublattice $H(E_8)$, and then add the appropriate translation vector based on the identified coset, i.e., the value of $r^j$. However, this approach may well be inordinately expensive to implement, given the large amounts of memory involved. Alternatively, signal generator 21 may be a programmed general- or special-purpose processor, which implements the following two-step procedure, the latter being an implementation of the technique disclosed in J. H. Conway and N. J. A. Sloane, "A fast encoding method for lattice codes and quantizers," *IEEE Transactions on Information Theory*, Vol. IT-29, pp. 820–824, 1983:

1. Map each different value of $u^j$ into a unique element of the sublattice $H(E_8)$ by doing the following:

a. Form an eight-dimensional vector $c^j$, each of whose elements has the value, base 4, of a corresponding pair of bits $u^j$ so that each pair of bits in the $u^j$ having the values 00, 01 10, and 11 correspond to 0, 1, 2 and 3, respectively, in $c^j$.

An example:
   $u^j = (0,0,1,0,1,1,0,1)$ yields $c^j = (0,2,3,1)$.

b. Form the product $w^j = c^j J'$. This product is an 8-dimensional vector which is a linear combination of the rows of $J'$. Hence $w^j$ is a point in the sublattice $H(E_8)$ uniquely associated with the value of the input word.

2. Map $w^j$ into the corresponding element $x^j$ of a particular coset of $H(E_8)$, as identified by the coset-identifying word on leads 13, by translating $w^j$ by $s_r$. That is, $x^j = w^j + s_r$.

From the pure coding theory standpoint, the approach as outlined so far will, indeed, yield a trellis coding arrangement with coding gain. However, it has a number of disadvantages from the standpoint of practical implementation. For example, the points of the sublattice that are identified in step (1) will not be grouped around the origin. That is, some points of relatively large norm—corresponding to signal power in the signal actually transmitted—will be in the alphabet while other points of lower norm will not be in the alphabet. This results in an inefficient use of signal power.

An advantageous way to ensure that the points used in the alphabet are optimally grouped around the origin, and thereby minimize the required signal power, is to find the point $b^j$ in the lattice $4H(E_8)$ to which the point $x^j$ is the closest and subtracting the coordinates of $b^j$ therefrom to yield a newly mapped point $y^j = x^j - b^j = w^j + s_r - b^j$. It can easily be shown that this procedure effects a mapping of the $4^8$ points of coset $C_r$ into a $4^8$-point Voronoi-cell-shaped region of the sublattice $H(E_8)$ centered very near the origin at the point $s_r$.

Practical implementation of the foregoing requires an efficient technique for finding the point of $4H(E_8)$ that is closest to a given point. To accomplish this, we make use of a known technique for finding the point of $H(E_8)$ that is closest to a given point. That technique, in particular, is the technique disclosed in U.S. Pat. No. 4,507,648 issued Mar. 26, 1985 to J. H. Conway and N. J. A. Sloane which is applicable to any lattice formed as the union of cosets in the well-known lattice $D_8$. $H(E_8)$ is, in fact, such a lattice, it being the union of $D_8$ with the lattice $(\frac{1}{2}, \frac{1}{2}, \frac{1}{2}, \frac{1}{2}, \frac{1}{2}, \frac{1}{2}, \frac{1}{2}, \frac{1}{2}) + D_8$ and that lattice being shown in TABLE II of the Conway/Sloane patent.

Advantageously, the technique disclosed in the Conway/Sloane patent can be used here by modeling the problem in $\frac{1}{4}$ scale and then scaling back-up. That is, in order to find the point in $4H(E_8)$ to which $x^j$ is closest, we use the Conway/Sloane technique to find the point $a^j$ in $H(E_8)$ to which the point $x^j/4$ is the closest. Scaling back up, the desired point $b^j$ in $4H(E_8)$ is then given by $4a^j$. That is, $y^j = w^j + s_r - 4a^j$.

In many applications, there are other considerations that may make further enhancements desirable. In particular, the lattice $E_8$ includes a point at the origin which is often undesirable. In addition, many of the points of the lattice $E_8$ have a factor of $\frac{1}{2}$, and using signal points whose components are not always integers may make the implementation of the circuitry which follows the signal point generator, such as modulator 40, more complex. Advantageously, both of these considerations can be dealt with by (a) subtracting a vector $h=(\frac{1}{2},\frac{1}{2},\frac{1}{2},\frac{1}{2},\frac{1}{2},\frac{1}{2},\frac{1}{2},\frac{1}{2})$ from $w^j$ and b) using as the signal point generator 21 output on leads 22 not the point $y^j$, but rather a point $x^j=4y^j$ so that $x^j=4(w^j+s_r-4a^j-h)$.

This results in an alphabet of signal points of the lattice $4E_8-u$, where u is a translation vector $(1,1,1,1,1,1,1,1)$. As desired, this is a lattice comprised of points each of whose components is an integer—in fact, always an odd integer—and which does not include a point at the origin. The sublattice is $4H(E_8)-u$ and the $r^{th}$ coset, $C_r$, is $4[H(E_8)+s_r]-u$.

(From the standpoint of strict mathematical definition, a lattice must include a point at the origin. Geometrically speaking, however, a lattice and translates thereof are equivalent, and it is to be understood that the terms lattice and sublattice as used in this description and in the claims hereof are intended to encompass not only a lattice or sublattice which meets the strict mathematical definition, but also also any translate thereof, even though such translate does not include a point at the origin.)

To summarize, then, the overall procedure for mapping the bits input to generator 21 into a point of the lattice $2E_8-u$ is 1. Follow step (1) as above to obtain $w^j$.
2. Form $y^j=w^j+s_j-h$.
3. Find the point $a_j$ in $E_8$ that is closest to the point $y^j/4$.
4. The desired alphabet point $x^j$ is then given by $x^j=4(y^j-4a^j)$.

Further discussion of 8-dimensional trellis codes, including other illustrative examples of codes embodying the principles of the present invention can be found in our paper "An Eight-Dimensional Trellis Code," *Proceedings of the IEEE*, Vol. 74, No. 5, May 1986, hereby incorporated by reference. In addition, a detailed discussion of the basic principle of signal coding using lattice cosets can be found in our paper "New trellis codes," *IEEE Transactions on Information Theory*, Vol. IT-33, No. 2, March 1987, pp. 177-195, also hereby incorporated by reference.

Demodulation and decoding of the received alphabet points at the far end of the channel can be accomplished in straightforward fashion using the very same techniques—including, for example, Viterbi decoding—that are already known for trellis coding generally. Since this is all already well-known in the art, there is no need for a discussion of it here. It may be noted, however, that a part of the Viterbi decoding involves identifying the point in each subset (coset, in this invention) that is closest to the received signal point. In the general case, this may give rise to significant problems in the practical implementation of a system using 8-dimensional coding because "brute-force" techniques for identifying that closest point in eight dimensions may require an inordinate amount of processing time and/or circuitry. However, since, as noted above, each coset in the present illustrative embodiment can be expressed as the union of translates of the aforementioned well-known lattice $D_8$ the above-discussed technique in the Conway/Sloane patent. can advantageously be used to quickly make that identification for each coset.

The foregoing merely illustrates the principles of the invention. For example, although the illustrative embodiment discloses a particular alphabet based on a particular lattice and sublattice and using a particular code to generate $r^j$, it will be appreciated that the present invention can be implemented using other alphabets based on other lattices and/or sublattices—including those having other than eight dimensions—and using other codes to generate $r^j$, including other trellis codes or other bit-expanding codes, such as a Reed-Solomon code. In addition, although the system disclosed herein is embodied in the form of various discrete electronic building blocks and components, the invention could equally as well be embodied in a system in which the functions of any one or more of those building blocks and components or, indeed, all of the function thereof, are realized by, for example, one or more appropriately programmed processors.

It will thus be appreciated that those skilled in the art will be able to devise numerous arrangements which, although not explicitly shown or described herein, embody the principles of the invention and are thus within its spirit and scope.

What is claimed is:

1. A transmitter adapted to generate a sequence of output signals in response to a sequence of (k+n)-bit input words, each of said output signals representing a respective point of predetermined p-dimensional lattice, k and n being integers and p being an integer greater than 4, said transmitter comprising coding means responsive to at least the values of n bits of each input word in said input word sequence for identifying one of $2^m$ predetermined cosets in said lattice, m being an integer greater than n, said predetermined cosets being other than the cosets 1 through 16 defined as follows:

| 11 | Coset 7 | Coset 4 | Coset 9 | Coset 10 |
|----|---------|---------|---------|----------|
| 12 | A0A0B1A1 | A0A0B1A0 | A0A0B0B1 | A0A0B0B0 |
| 13 | A0B1A0A0 | A0B1A0A1 | A0B1A1B0 | A0B1A1B1 |
| 14 | A0B0A1A0 | A0B0A1A1 | A0B0A0B0 | A0B0A0B1 |
| 15 | A0A1B0A1 | A0A1B0A0 | A0A1B1B1 | A0A1B1B0 |
| 16 | B1A0B0B0 | B1A0B0B1 | B1A0B1A0 | B1A0B1A1 |
| 17 | B1B1A1B1 | B1B1A1B0 | B1B1A0A1 | B1B1A0A0 |
| 18 | B1B0A0B1 | B1B0A0B0 | B1B0A1A1 | B1B0A1A0 |
| 19 | B1A1B1B0 | B1A1B1B1 | B1A1B0A0 | B1A1B0A1 |
| 20 | B0A0B0B1 | B0A0B0B0 | B0A0B1A1 | B0A0B1A0 |
| 21 | B0B1A1B0 | B0B1A1B1 | B0B1A1A0 | B0B1A0A1 |
| 22 | B0B0A0B0 | B0B0A0B1 | B0B0A1A0 | B0B0A1A1 |
| 23 | B0A1B1B1 | B0A1B1B0 | B0A1B0A1 | B0A1B0A0 |
| 24 | A1A0B1A0 | A1A0B1A1 | A1A0B0B0 | A1A0B0B1 |
| 25 | A1B1A0A1 | A1B1A0A0 | A1B1A1B1 | A1B1A1B0 |
| 26 | A1B1A1A1 | A1B0A1A0 | A1B0A0B1 | A1B0A0B0 |
| 27 | A1A1B1A0 | A1A1B0A1 | A1A1B1B0 | A1A1B1B1 |

| 28 | Coset 5 | Coset 6 | Coset 11 | Coset 8 |
|----|---------|---------|----------|---------|
| 29 | A0A0B1B1 | A0A0B1B0 | A0A0B0A1 | A0A0B0A0 |
| 30 | A0B1A0B0 | A0B1A0B1 | A0B1A1A0 | A0B1A1A1 |
| 31 | A0B0A1B0 | A0B0A1B1 | A0B0A0A0 | A0B0A0A1 |
| 32 | A0A1B0B1 | A0A1B0B0 | A0A1B1A1 | A0A1B1A0 |
| 33 | B1A0B0A0 | B1A0B0A1 | B1A0B1B0 | B1A0B1B1 |
| 34 | B1B1A1A1 | B1B1A1A0 | B1B1A0B1 | B1B1A0B0 |
| 35 | B1B0A0A1 | B1B0A0A0 | B1B0A1B1 | B1B0A1B0 |
| 36 | B1A1B1A0 | B1A1B1A1 | B1A1B0B0 | B1A1B0B1 |
| 37 | B0A0B0A1 | B0A0B0A0 | B0A0B1B1 | B0A0B1B0 |
| 38 | B0B1A1A0 | B0B1A1A1 | B0B1A0B0 | B0B1A0B1 |
| 39 | B0B0A0A0 | B0B0A0A1 | B0B0A1B0 | B1B0A1B1 |
| 40 | B0A1B1A1 | B0A1B1A0 | B0A1B0B1 | B1A1B0B0 |
| 41 | A1A0B1B0 | A1A0B1B1 | A1A0B0A0 | A1A0B0A1 |
| 42 | A1B1A0B1 | A1B1A0B0 | A1B1A1A1 | A1B1A1A0 |

-continued

| | | | | |
|---|---|---|---|---|
| 43 | A1B0A1B1 | A1B0A1B0 | A1B0A0A1 | A1B0A0A0 |
| 44 | A1A1B0B0 | A1A1B0B1 | A1A1B1A0 | A1A1B1A1 |

| | | | | |
|---|---|---|---|---|
| 45 | Coset 15 | Coset 12 | Coset 1 | Coset 2 |
| 46 | A0A0A1A1 | A0A0A1A0 | A0A0A0B1 | A0A0A0B0 |
| 47 | A0B1B0A0 | A0B1B1A0 | A0B1B1B0 | A0B1B1B1 |
| 48 | A0B0B1A0 | A0B0B1A1 | A0B0B0B0 | A0B0B0B1 |
| 49 | A0A1A0A1 | A0A1A0A0 | A0A1A1B1 | A0A1A1B0 |
| 50 | B1A0A0B0 | B1A0A0B1 | B1A0A1A0 | B1A0A1A1 |
| 51 | B1B1B1B1 | B1B1B1B0 | B1B1B0A1 | B1B1B0A0 |
| 52 | B1B0B0B1 | B1B0B0B0 | B1B0B1A1 | B1B0B1A0 |
| 53 | B1A1A1B0 | B1A1A1B1 | B1A1A0A0 | B1A1A0A1 |
| 54 | B0A0A0B1 | B0A0A0B0 | B0A0A1A1 | B0A0A1A0 |
| 55 | B0B1B1B0 | B0B1B1B1 | B0B1B0A0 | B0B1B0A1 |
| 56 | B0B0B0B0 | B0B0B0B1 | B0B0B1A0 | B0B0B1A1 |
| 57 | B0A1A1B1 | B0A1A1B0 | B0A1A0A1 | B0A1A0A0 |
| 58 | A1A0A1A0 | A1A0A1A1 | A1A0A0B0 | A1A0A0B1 |
| 59 | A1B1B0A1 | A1B1B0A0 | A1B1B1B1 | A1B1B1B0 |
| 60 | A1B0B1A1 | A1B0B1A0 | A1B0B0B0 | A1B0B0B1 |
| 61 | A1A1A0A0 | A1A1A0A1 | A1A1A1B0 | A1A1A1B1 |

| | | | | |
|---|---|---|---|---|
| 62 | Coset 13 | Coset 14 | Coset 3 | Coset 0 |
| 63 | A0A0A1B1 | A0A0A1B0 | A0A0A0A1 | A0A0A0A0 |
| 64 | A0B1B0B0 | A0B1B0B1 | A0B1B1A1 | A0B1B1A0 |
| 65 | A0B0B1B0 | A0B0B1B1 | A0B0B0A0 | A0B0B0A1 |
| 66 | A0A1A0B1 | A0A1A0B0 | A0A1A1A1 | A0A1A1A0 |
| 67 | B1A0A0A0 | B1A0A0A1 | B1A0A1B0 | B1A0A1B1 |
| 68 | B1B1B1A1 | B1B1B1A0 | B1B1B0B1 | B1B1B0B0 |
| 69 | B1B0B0A1 | B1B0B0A0 | B1B0B1B1 | B1B0B1B0 |
| 70 | B1A1A1A0 | B1A1A1A1 | B1A1A0B0 | B1A1A0B1 |
| 71 | B0A0A0A1 | B0A0A0A0 | B0A0A1B1 | B0A0A1B0 |
| 72 | B0B1B1A0 | B0B1B1A1 | B0B1B0B0 | B0B1B0B1 |
| 73 | B0B0B0A0 | B0B0B0A1 | B0B0B1B0 | B0B0B1B1 |
| 74 | B0A1A1A1 | B0A1A1A0 | B0A1A0B1 | B0A1A0B0 |
| 75 | A1A0A1B0 | A1A0A1B1 | A1A0A0A0 | A1A0A0A1 |
| 76 | A1B1B0B1 | A1B1B0B0 | A1B1B1A1 | A1B1B1A0 |
| 77 | A1B0B1B1 | A1B0B1B0 | A1B0B0A1 | A1B0B0A0 |
| 78 | A1A1A0B0 | A1A1A0B1 | A1A1A1A0 | A1A1A1A1 | wherein A0, A1, B0 and B1 respectively represent 2-dimensional symbols of 2-dimensional subsets A0, A1, B0 and B1 of a predetermined 2-dimensional symbol constellation, said 2-dimensional symbols being represented by said 2-dimensional subsets in such a way that B1 alternates with A0 within first rows of said 2-dimensional symbols, A1 alternates with B0 within second rows of said 2-dimensional symbols, said first rows alternate with said second rows in said 2-dimensional symbol constellation, B1 alternates with A1 within first columns of said 2-dimensional symbols, B0 alternates with A0 within second columns of said 2-dimensional symbols, and said first columns alternate with said second columns in said 2-dimensional symbol constellation, means responsive at least to the k bits of said each input word other than said n bits for identifying an individual one of the lattice points in said one predetermined coset, and means for generating a signal representing said individual one of said lattice points, that signal being an individual one of said sequence of output signals.

2. The invention of claim 1 wherein said coding means is further responsive to the value of at least one bit of a previous input word in said input word sequence for identifying said one of said predetermined cosets.

3. The invention of claim 2 wherein said coding means trellis codes said n bits and said at least one bit to identify said one predetermined cosets.

4. The invention of claim 1 wherein each of the components of the signal points of said lattice is an odd integer.

5. The invention of claim 1 wherein said lattice is a translate of the eight-dimensional Gosset lattice.

6. A transmitter adapted to generate a sequence of signal points each representing a respective input word of a sequence of (k+n)-bit input words, each of said signal points being selected from a predetermined alphabet of $2^{(k+m)}$ signal points taken from a predetermined p-dimensional lattice, k, m, n and p being predetermined integers where m is greater than n and p is greater than 4, said transmitter comprising means for identifying one of $2^m$ predetermined subsets of said lattice for each input word of said input word sequence in response to the values of n bits of said each input word and the value of at least one bit of a previous input word in said input word sequence, and means for generating a particular point of said one subset as a function at least of the k bits of said each input word other than said n bits, said subsets being cosets in said lattice, and said cosets being other than the cosets 1 through 16 defined as follows:

| | | | | |
|---|---|---|---|---|
| 15 | Coset 7 | Coset 4 | Coset 9 | Coset 10 |
| 16 | A0A0B1A1 | A0A0B1A0 | A0A0B0B1 | A0A0B0B0 |
| 17 | A0B1A0A0 | A0B1A0A1 | A0B1A1B0 | A0B1A1B1 |
| 18 | A0B0A1A0 | A0B0A1A1 | A0B0A0B0 | A0B0A0B1 |
| 19 | A0A1B0A1 | A0A1B0A0 | A0A1B1B1 | A0A1B1B0 |
| 20 | B1A0B0B0 | B1A0B0B1 | B1A0B1A0 | B1A0B1A1 |
| 21 | B1B1A1B1 | B1B1A1B0 | B1B1A0A1 | B1B1A0A0 |
| 22 | B1B0A0B1 | B1B0A0B0 | B1B0A1A1 | B1B0A1A0 |
| 23 | B1A1B1B0 | B1A1B1B1 | B1A1B0A0 | B1A1B0A1 |
| 24 | B0A0B0B1 | B0A0B0B0 | B0A0B1A1 | B0A0B1A0 |
| 25 | B0B1A1B0 | B0B1A1B1 | B0B1A0A0 | B0B1A0A1 |
| 26 | B0B0A0B0 | B0B0A0B1 | B0B0A1A0 | B0B0A1A1 |
| 27 | B0A1B1B1 | B0A1B1B0 | B0A1B0A1 | B0A1B0A0 |
| 28 | A1A0B1A0 | A1A0B1A1 | A1A0B0B0 | A1A0B0B1 |
| 29 | A1B1A0A1 | A1B1A0A0 | A1B1A1B1 | A1B1A1B0 |
| 30 | A1B0A1A1 | A1B0A1A0 | A1B0A0B1 | A1B0A0B0 |
| 31 | A1A1B0A0 | A1A1B0A1 | A1A1B1B0 | A1A1B1B1 |

| | | | | |
|---|---|---|---|---|
| 32 | Coset 5 | Coset 6 | Coset 11 | Coset 8 |
| 33 | A0A0B1B1 | A0A0B1B0 | A0A0B0A1 | A0A0B0A0 |
| 34 | A0B1A0B0 | A0B1A0B1 | A0B1A1A0 | A0B1A1A1 |
| 35 | A0B0A1B0 | A0B0A1B1 | A0B0A0A0 | A0B0A0A1 |
| 36 | A0A1B0B1 | A0A1B0B0 | A0A1B1A1 | A0A1B1A0 |
| 37 | B1A0B0A0 | B1A0B0A1 | B1A0B1B0 | B1A0B1B1 |
| 38 | B1B1A1A1 | B1B1A1A0 | B1B1A0B1 | B1B1A0B0 |
| 39 | B1B0A0A1 | B1B0A0A0 | B1B0A1B1 | B1B0A1B0 |
| 40 | B1A1B1A0 | B1A1B1A1 | B1A1B0B0 | B1A1B0B1 |
| 41 | B0A0B0A1 | B0A0B0A0 | B0A0B1B1 | B0A0B1B0 |
| 42 | B0B1A1A0 | B0B1A1A1 | B0B1A0B0 | B0B1A0B1 |
| 43 | B0B0A0A0 | B0B0A0A1 | B0B0A1B0 | B1B0A1B1 |
| 44 | B0A1B1A1 | B0A1B1A0 | B0A1B0B1 | B1A1B0B0 |
| 45 | A1A0B1B1 | A1A0B1B0 | A1A0B0A0 | A1A0B0A1 |
| 46 | A1B1A0B1 | A1B1A0B0 | A1B1A1A1 | A1B1A1A0 |
| 47 | A1B0A1B1 | A1B0A1B0 | A1B0A0A1 | A1B0A0A0 |
| 48 | A1A1B0B0 | A1A1B0B1 | A1A1B1A0 | A1A1B1A1 |

| | | | | |
|---|---|---|---|---|
| 49 | Coset 15 | Coset 12 | Coset 1 | Coset 2 |
| 50 | A0A0A1A1 | A0A0A1A0 | A0A0A0B1 | A0A0A0B0 |
| 51 | A0B1B0A0 | A0B1B0A1 | A0B1B1B0 | A0B1B1B1 |
| 52 | A0B0B1A0 | A0B0B1A1 | A0B0B0B0 | A0B0B0B1 |
| 53 | A0A1A0A1 | A0A1A0A0 | A0A1A1B1 | A0A1A1B0 |
| 54 | B1A0A0B0 | B1A0A0B1 | B1A0A1A0 | B1A0A1A1 |
| 55 | B1B1B1B1 | B1B1B1B0 | B1B1B0A1 | B1B1B0A0 |
| 56 | B1B0B0B1 | B1B0B0B0 | B1B0B1A1 | B1B0B1A0 |
| 57 | B1A1A1B0 | B1A1A1B1 | B1A1A0A0 | B1A1A0A1 |
| 58 | B0A0A0B1 | B0A0A0B0 | B0A0A1A1 | B0A0A1A0 |
| 59 | B0B1B1B0 | B0B1B1B1 | B0B1B0A0 | B0B1B0A1 |
| 60 | B0B0B0B0 | B0B0B0B1 | B0B0B1A0 | B0B0B1A1 |
| 61 | B0A1A1B1 | B0A1A1B0 | B0A1A0A1 | B0A1A0A0 |
| 62 | A1A0A1A0 | A1A0A1A1 | A1A0A0B0 | A1A0A0B1 |
| 63 | A1B1B0A1 | A1B1B0A0 | A1B1B1B1 | A1B1B1B0 |
| 64 | A1B0B1A1 | A1B0B1A0 | A1B0B0B1 | A1B1B0B0 |
| 65 | A1A1A0A0 | A1A1A0A1 | A1A1A1B0 | A1A1A1B1 |

-continued

| 66 | Coset 13 | Coset 14 | Coset 3 | Coset 0 |
|---|---|---|---|---|
| 67 | A0A0A1B1 | A0A0A1B0 | A0A0A0A1 | A0A0A0A0 |
| 68 | A0B1B0B0 | A0B1B0B1 | A0B1B1A0 | A0B1B1A1 |
| 69 | A0B0B1B0 | A0B0B1B1 | A0B0B0A0 | A0B0B0A1 |
| 70 | A0A1A0B1 | A0A1A0B0 | A0A1A1A1 | A0A1A1A0 |
| 71 | B1A0A0A0 | B1A0A0A1 | B1A0A1B0 | B1A0A1B1 |
| 72 | B1B1B1A1 | B1B1B1A0 | B1B1B0B1 | B1B1B0B0 |
| 73 | B1B0B0A1 | B1B0B0A0 | B1B0B1B1 | B1B0B1B0 |
| 74 | B1A1A1A0 | B1A1A1A1 | B1A1A0B1 | B1A1A0B0 |
| 75 | B0A0A0A1 | B0A0A0A0 | B0A0A1B1 | B0A0A1B0 |
| 76 | B0B1B1A0 | B0B1B1A1 | B0B1B0B0 | B0B1B0B1 |
| 77 | B0B0B0A0 | B0B0B0A1 | B0B0B1B0 | B0B0B1B1 |
| 78 | B0A1A1A1 | B0A1A1A0 | B0A1A0B0 | B0A1A0B1 |
| 79 | A1A0A1B0 | A1A0A1B1 | A1A0A0A0 | A1A0A0A1 |
| 80 | A1B1B0B1 | A1B1B0B0 | A1B1B1A1 | A1B1B1A0 |
| 81 | A1B0B1B1 | A1B0B1B0 | A1B0B0A1 | A1B0B0A0 |
| 82 | A1A1A0B0 | A1A1A0B1 | A1A1A1A0 | A1A1A1A1 | wherein A0, A1, B0 and B1 respectively represent 2-dimensional symbols of 2-dimensional subsets A0, A1, B0 and B1 of a predetermined 2-dimensional symbol constellation, said 2-dimensional symbols being represented by said 2-dimensional subsets in such a way that B1 alternates with A0 within first rows of said 2-dimensional symbols, A1 alternates with B0 within second rows of said 2-dimensional symbols, said first rows alternate with said second rows in said 2-dimensional symbol constellation, B1 alternates with A1 within first columns of said 2-dimensional symbols, B0 alternates with A0 within second columns of said 2-dimensional symbols, and said first columns alternate with said second columns in said 2-dimensional symbol constellation.

7. The invention of claim 6 wherein each of the components of each of the points of said lattice is an odd integer.

8. The invention of claim 6 wherein said lattice is a translate of the eight-dimensional Gosset lattice.

9. A method for use in a transmitter adapted to generate a sequence of output signals in response to a sequence of (k+n)-bit input words, each of said output signals representing a respective point of a predetermined p-dimensional lattice, p being an integer greater than 4, said method comprising the steps of
identifying in response to at least the values of n bits of each input word in said input word sequence one of $2^m$ predetermined cosets in said lattice, m being an integer greater than n, said predetermined cosets being other than the cosets 1 through 16 defined as follows:

| 10 | Coset 7 | Coset 4 | Coset 9 | Coset 10 |
|---|---|---|---|---|
| 11 | A0A0B1A1 | A0A0B1A0 | A0A0B0B1 | A0A0B0B0 |
| 12 | A0B1A0A0 | A0B1A0A1 | A0B1A1B0 | A0B1A1B1 |
| 13 | A0B0A1A0 | A0B0A1A1 | A0B0A0B0 | A0B0A0B1 |
| 14 | A0A1B0A1 | A0A1B0A0 | A0A1B1B1 | A0A1B1B0 |
| 15 | B1A0B0B0 | B1A0B0B1 | B1A0B1A0 | B1A0B1A1 |
| 16 | B1B1A1B1 | B1B1A1B0 | B1B1A0A0 | B1B1A0A1 |
| 17 | B1B0A0B1 | B1B0A0B0 | B1B0A1A1 | B1B0A1A0 |
| 18 | B1A1B1B0 | B1A1B1B1 | B1A1B0A0 | B1A1B0A1 |
| 19 | B0A0B0B1 | B0A0B0B0 | B0A0B1A1 | B0A0B1A0 |
| 20 | B0B1A1B0 | B0B1A1B1 | B0B1A0A1 | B0B1A0A0 |
| 21 | B0B0A0B0 | B0B0A0B1 | B0B0A1A0 | B0B0A1A1 |
| 22 | B0A1B1B1 | B0A1B1B0 | B0A1B0A1 | B0A1B0A0 |
| 23 | A1A0B1A0 | A1A0B1A1 | A1A0B0B0 | A1A0B0B1 |
| 24 | A1B1A0A1 | A1B1A0A0 | A1B1A1B1 | A1B1A1B0 |
| 25 | A1B0A1A1 | A1B0A1A0 | A1B0A0B1 | A1B0A0B0 |
| 26 | A1A1B0A0 | A1A1B0A1 | A1A1B1B0 | A1A1B1B1 |
| 27 | Coset 5 | Coset 6 | Coset 11 | Coset 8 |
| 28 | A0A0B1B1 | A0A0B1B0 | A0A0B0A1 | A0A0B0A0 |
| 29 | A0B1A0B0 | A0B1A0B1 | A0B1A1A0 | A0B1A1A1 |
| 30 | A0B0A0B0 | A0B0A1B1 | A0B0A0A0 | A0B0A0A1 |
| 31 | A0A1B0B1 | A0A1B0B0 | A0A1B1A1 | A0A1B1A0 |
| 32 | B1A0B0A0 | B1A0B0A1 | B1A0B1B0 | B1A0B1B1 |
| 33 | B1B1A1A1 | B1B1A1A0 | B1B1A0B1 | B1B1A0B0 |
| 34 | B1B0A0A1 | B1B0A0A0 | B1B0A1B1 | B1B0A1B0 |
| 35 | B1A1B1A0 | B1A1B1A1 | B1A1B0B0 | B1A1B0B1 |
| 36 | B0A0B0A1 | B0A0B0A0 | B0A0B1B1 | B0A0B1B0 |
| 37 | B0B1A1A0 | B0B1A1A1 | B0B1A0B0 | B0B1A0B1 |
| 38 | B0B0A0A0 | B0B0A0A1 | B0B0A1B0 | B1B0A1B1 |
| 39 | B0A1B1A1 | B0A1B1A0 | B0A1B0B1 | B1A1B0B0 |
| 40 | A1A0B1B0 | A1A0B1B1 | A1A0B0A0 | A1A0B0A1 |
| 41 | A1B1A0B1 | A1B1A0B0 | A1B1A1A1 | A1B1A1A0 |
| 42 | A1B0A1B1 | A1B0A1B0 | A1B0A0A1 | A1B0A0A0 |
| 43 | A1A1B0B0 | A1A1B0B1 | A1A1B1A0 | A1A1B1A1 |
| 44 | Coset 15 | Coset 12 | Coset 1 | Coset 2 |
| 45 | A0A0A1A1 | A0A0A1A0 | A0A0A0B1 | A0A0A0B0 |
| 46 | A0B1B0A1 | A0B1B0A0 | A0B1B1B0 | A0B1B1B1 |
| 47 | A0B0B1A0 | A0B0B1A1 | A0B0B0B0 | A0B0B0B1 |
| 48 | A0A1A0A1 | A0A1A0A0 | A0A1A1B1 | A0A1A1B0 |
| 49 | B1A0A0B0 | B1A0A0B1 | B1A0A1A0 | B1A0A1A1 |
| 50 | B1B1B1B0 | B1B1B1B0 | B1B1B0A1 | B1B1B0A0 |
| 51 | B1B0B0B1 | B1B0B0B0 | B1B0B1A1 | B1B0B1A0 |
| 52 | B1A1A1B0 | B1A1A1B1 | B1A1A0A0 | B1A1A0A1 |
| 53 | B0A0A0B1 | B0A0A0B0 | B0A0A1A1 | B0A0A1A0 |
| 54 | B0B1B1B0 | B0B1B1B1 | B0B1B0A0 | B0B1B0A1 |
| 55 | B0B0B0B0 | B0B0B0B1 | B0B0B1A0 | B0B0B1A1 |
| 56 | B0A1A1B1 | B0A1A1B0 | B0A1A0A1 | B0A1A0A0 |
| 57 | A1A0A1A0 | A1A0A1A1 | A1A0A0B0 | A1A0A0B1 |
| 58 | A1B1B0A1 | A1B1B0A0 | A1B1B1B1 | A1B1B1B0 |
| 59 | A1B0B1A1 | A1B0B1A0 | A1B0B0B1 | A1B0R0B0 |
| 60 | A1A1A0A0 | A1A1A0A1 | A1A1A1B0 | A1A1A1B1 |
| 61 | Coset 13 | Coset 14 | Coset 3 | Coset 0 |
| 62 | A0A0A1B1 | A0A0A1B0 | A0A0A0A1 | A0A0A0A0 |
| 63 | A0B1B0B0 | A0B1B0B1 | A0B1B1A0 | A0B1B1A1 |
| 64 | A0B0B1B0 | A0B0B1B1 | A0B0B0A0 | A0B0B0A1 |
| 65 | A0A1A0B1 | A0A1A0B0 | A0A1A1A1 | A0A1A1A0 |
| 66 | B1A0A0A0 | B1A0A0A1 | B1A0A1B0 | B1A0A1B1 |
| 67 | B1B1B1A1 | B1B1B1A0 | B1B1B0B1 | B1B1B0B0 |
| 68 | B1B0B0A1 | B1B0B0A0 | B1B0B1B1 | B1B0B1B0 |
| 69 | B1A1A1A0 | B1A1A1A1 | B1A1A0B1 | B1A1A0B0 |
| 70 | B0A0A0A1 | B0A0A0A0 | B0A0A1B1 | B0A0A1B0 |
| 71 | B0B1B1A0 | B0B1B1A1 | B0B1B0B0 | B0B1B0B1 |
| 72 | B0B0B0A0 | B0B0B0A1 | B0B0B1B0 | B0B0B1B1 |
| 73 | B0A1A1A1 | B0A1A1A0 | B0A1A0B1 | B0A1A0B0 |
| 74 | A1A0A1B0 | A1A0A1B1 | A1A0A0A0 | A1A0A0A1 |
| 75 | A1B1B0B1 | A1B1B0B0 | A1B1B1A1 | A1B1B1A0 |
| 76 | A1B0B1B1 | A1B0B1B0 | A1B0B0A1 | A1B0B0A0 |
| 77 | A1A1A0B0 | A1A1A0B1 | A1A1A1A0 | A1A1A1A1 | wherein A0, A1, B0 and B1 respectively represent 2-dimensional symbols of 2-dimensional subsets A0, A1, B0 and B1 of a predetermined 2-dimensional symbol constellation, said 2-dimensional symbols being represented by said 2-dimensional subsets in such a way that B1 alternates with A0 within first rows of said 2-dimensional symbols, A1 alternates with B0 within second rows of said 2-dimensional symbols, said first rows alternate with said second rows in said 2-dimensional symbol constellation, B1 alternates with A1 within first columns of said 2-dimensional symbols, B0 alternates with A0 within second columns of said 2-dimensional symbols, and said first columns alternate with said second columns in said 2-dimensional symbol constellation.

identifying in response at least to the k bits of said each input word other than said n bits an individual one of the lattice points in said one predetermined coset, and generating as an individual one of said sequence of output signals a signal representing said individual one of said lattice points.

10. The invention of claim 9 wherein in the first of said identifying steps said one of said predetermined cosets is identified further in response to the value of at least one bit of a previous input word in said input word sequence.

11. The invention of claim 10 wherein in said first of said identifying steps said n bits and said at least one bit are trellis coded to identify said one predetermined coset.

12. The invention of claim 9 wherein each of the components of the points of said lattice is an odd integer.

13. The invention of claim 9 wherein said lattice is a translate of the eight-dimensional Gosset lattice.

14. A method for use in transmitter adapted to generate a sequence of signal points each representing a respective input word of a sequence of (k+n)-bit input words, each of said signal points being selected from a predetermined alphabet of $2^{(k+m)}$ signal points taken from a predetermined p-dimensional lattice, k, m, n and p being predetermined integers where m is greater than n and p is greater than 4, said method comprising the steps of identifying $2^m$ predetermined subsets of said lattice for each input word of said input word sequence in response to the values of n bits of said each input word and the value of at least one bit of a previous input word in said input word sequence, and generating a particular point of said one subsets as a function at least of the k bits of said each input word other than said n bits, said subsets being cosets in said lattice, and said cosets being other than the cosets 1 through 16 defined as follows:

| 16 | Coset 7 | Coset 4 | Coset 9 | Coset 10 |
|---|---|---|---|---|
| 17 | A0A0B1A1 | A0A0B1A0 | A0A0B0B1 | A0A0B0B0 |
| 18 | A0B1A0A0 | A0B1A0A1 | A0B1A1B0 | A0B1A1B1 |
| 19 | A0B0A1A0 | A0B0A1A1 | A0B0A0B0 | A0B0A0B1 |
| 20 | A0A1B0A1 | A0A1B0A0 | A0A1B1B1 | A0A1B1B0 |
| 21 | B1A0B0B0 | B1A0B0B1 | B1A0B1A0 | B1A0B1A1 |
| 22 | B1B1A1B1 | B1B1A1B0 | B1B1A0A1 | B1B1A0A0 |
| 23 | B1B0A0B1 | B1B0A0B0 | B1B0A1A1 | B1B0A1A0 |
| 24 | B1A1B1B0 | B1A1B1B1 | B1A1B0A0 | B1A1B0A1 |
| 25 | B0A0B0B1 | B0A0B0B0 | B0A0B1A1 | B0A0B1A0 |
| 26 | B0B1A1B0 | B0B1A1B1 | B0B1A0A0 | B0B1A0A1 |
| 27 | B0B0A0B0 | B0B0A0B1 | B0B0A1A0 | B0B0A1A1 |
| 28 | B0A1B1B0 | B0A1B1B1 | B0A1B0A0 | B0A1B0A1 |
| 29 | A1A0B1A0 | A1A0B1A1 | A1A0B0B0 | A1A0B0B1 |
| 30 | A1B1A0A1 | A1B1A0A0 | A1B1A1B1 | A1B1A1B0 |
| 31 | A1B0A1A1 | A1B0A1A0 | A1B0A0B1 | A1B0A0B0 |
| 32 | A1A1B0A0 | A1A1B0A1 | A1A1B1B0 | A1A1B1B1 |

| 33 | Coset 5 | Coset 6 | Coset 11 | Coset 8 |
|---|---|---|---|---|
| 34 | A0A0B1B1 | A0A0B1B0 | A0A0B0A1 | A0A0B0A0 |
| 35 | A0B1A0B0 | A0B1A0B1 | A0B1A1A0 | A0B1A1A1 |
| 36 | A0B0A1B0 | A0B0A1B1 | A0B0A0A0 | A0B0A0A1 |
| 37 | A0A1B0B1 | A0A1B0B0 | A0A1B1A1 | A0A1B1A0 |
| 38 | B1A0B0A0 | B1A0B0A1 | B1A0B1B0 | B1A0B1B1 |
| 39 | B1B1A1A1 | B1B1A1A0 | B1B1A0B1 | B1B1A0B0 |
| 40 | B1B0A0A1 | B1B0A0A0 | B1B0A1B1 | B1B0A1B0 |
| 41 | B1A1B1A0 | B1A1B1A1 | B1A1B0B0 | B1A1B0B1 |

| 42 | B0A0B0A1 | B0A0B0A0 | B0A0B1B1 | B0A0B1B0 |
|---|---|---|---|---|
| 43 | B0B1A1A0 | B0B1A1A1 | B0B1A0B0 | B0B1A0B1 |
| 44 | B0B0A0A0 | B0B0A0A1 | B0B0A1B0 | B1B0A1B1 |
| 45 | B0A1B1A1 | B0A1B1A0 | B0A1B0B1 | B1A1B0B0 |
| 46 | A1A0B1B0 | A1A0B1B1 | A1A0B0A0 | A1A0B0A1 |
| 47 | A1B1A0B1 | A1B1A0B0 | A1B1A1A1 | A1B1A1A0 |
| 48 | A1B0A1B1 | A1B0A1B0 | A1B0A0A1 | A1B0A0A0 |
| 49 | A1A1B0B0 | A1A1B0B1 | A1A1B1A0 | A1A1B1A1 |

| 50 | Coset 15 | Coset 12 | Coset 1 | Coset 2 |
|---|---|---|---|---|
| 51 | A0A0A1A1 | A0A0A1A0 | A0A0A0B1 | A0A0A0B0 |
| 52 | A0B1B0A0 | A0B1B0A1 | A0B1B1B0 | A0B1B1B1 |
| 53 | A0B0B1A0 | A0B0B1A1 | A0B0B0B0 | A0B0B0B1 |
| 54 | A0A1A0A1 | A0A1A0A0 | A0A1A1B1 | A0A1A1B0 |
| 55 | B1A0A0B0 | B1A0A0B1 | B1A0A1A0 | B1A0A1A1 |
| 56 | B1B1B1B1 | B1B1B1B0 | B1B1B0A1 | B1B1B0A0 |
| 57 | B1B0B0B1 | B1B0B0B0 | B1B0B1A1 | B1B0B1A0 |
| 58 | B1A1A1B0 | B1A1A1B1 | B1A1A0A0 | B1A1A0A1 |
| 59 | B0A0A0B1 | B0A0A0B0 | B0A0A1A1 | B0A0A1A0 |
| 60 | B0B1B1B0 | B0B1B1B1 | B0B1B0A0 | B0B1B0A1 |
| 61 | B0B0B0B0 | B0B0B0B1 | B0B0B1A0 | B0B0B1A1 |
| 62 | B0A1A1B1 | B0A1A1B0 | B0A1A0A1 | B0A1A0A0 |
| 63 | A1A0A1A0 | A1A0A1A1 | A1A0A0B0 | A1A0A0B0 |
| 64 | A1B1B0A1 | A1B1B0A0 | A1B1B1B1 | A1B1B1B0 |
| 65 | A1B0B1A1 | A1B0B1A0 | A1B0B0B1 | A1B0B0B0 |
| 66 | A1A1A0A0 | A1A1A0A1 | A1A1A1B0 | A1A1A1B1 |

| 67 | Coset 13 | Coset 14 | Coset 3 | Coset 0 |
|---|---|---|---|---|
| 68 | A0A0A1B0 | A0A0A1B0 | A0A0A0A1 | A0A0A0A0 |
| 69 | A0B1B0B0 | A0B1B0B1 | A0B1B1A0 | A0B1B1A1 |
| 70 | A0B0B1B0 | A0B0B1B1 | A0B0B0A0 | A0A1A1A0 |
| 71 | A0A1A0B1 | A0A1A0B0 | A0A1A1A1 | A0A1A1A0 |
| 72 | B1A0A0A1 | B1A0A0A1 | B1A0A1B0 | B1A0A1B1 |
| 73 | B1B1B1A1 | B1B0B0A1 | B1B1B0B0 | B1B1B0B0 |
| 74 | B1B0B0A1 | B1B0B0A0 | B1B0B1B1 | B1B0B1B0 |
| 75 | B1A1A1A0 | B1A1A1A1 | B1A1A0B0 | B1A1A0B1 |
| 76 | B0A0A0A1 | B0A0A0A0 | B0A0A1B1 | B0A0A1B0 |
| 77 | B0B1B1A0 | B0B1B1A1 | B0B1B0B0 | B0B1B0B1 |
| 78 | B0B0B0A0 | B0B0B0A1 | B0B0B1B0 | B0B0B1B1 |
| 79 | B0A1A1A1 | B0A1A1A0 | B0A1A0B1 | B0A1A0B0 |
| 80 | A1A0A1B0 | A1A0A1B1 | A1A0A0A0 | A1A0A0A1 |
| 81 | A1B1B0B1 | A1B1B0B0 | A1B1B1A1 | A1B1B1A0 |
| 82 | A1B0B1B1 | A1B0B1B0 | A1B1B0A1 | A1B0B0A0 |
| 83 | A1A1A0B0 | A1A1A0B1 | A1A1A1A0 | A1A1A1A1 | wherein A0, A1, B0 and B1 respectively represent 2-dimensional symbols of 2-dimensional subsets A0, A1, B0 and B1 of a predetermined 2-dimensional symbol constellation, said 2-dimensional symbols being represented by said 2-dimensional subsets in such a way that B1 alternates with A0 within first rows of said 2-dimensional symbols, A1 alternates with B0 within second rows of said 2-dimensional symbols, said first rows alternate with said second rows in said 2-dimensional symbol constellation, B1 alternates with A1 within first columns of said 2-dimensional symbols, B0 alternates with A0 within second columns of said 2-dimensional symbols, and said first columns alternate with said second columns in said 2-dimensional symbol constellation.

15. The invention of claim 14 wherein each of the components of each of the signal points of said lattice is an odd integer.

16. The invention of claim 14 wherein said lattice is a translate of the eight-dimensional Gosset lattice.

* * * * *